United States Patent
Hamajima et al.

(10) Patent No.: US 9,975,311 B2
(45) Date of Patent: May 22, 2018

(54) PHENOLIC RESIN FOAM LAMINATED SHEET AND METHOD FOR MANUFACTURING THE SAME

(75) Inventors: Masato Hamajima, Tokyo (JP); Yoshimitsu Inoue, Tokyo (JP); Hisashi Mihori, Tokyo (JP); Yoshihito Fukasawa, Tokyo (JP)

(73) Assignee: ASAHI KASEI CONSTRUCTION MATERIALS CORPORATION, Tokyo (JP)

( * ) Notice: Subject to any disclaimer, the term of this patent is extended or adjusted under 35 U.S.C. 154(b) by 373 days.

(21) Appl. No.: 13/637,034

(22) PCT Filed: Mar. 25, 2011

(86) PCT No.: PCT/JP2011/057409
§ 371 (c)(1),
(2), (4) Date: Sep. 25, 2012

(87) PCT Pub. No.: WO2011/118793
PCT Pub. Date: Sep. 29, 2011

(65) Prior Publication Data
US 2013/0011655 A1    Jan. 10, 2013

(30) Foreign Application Priority Data
Mar. 26, 2010   (JP) ................................. 2010-073018

(51) Int. Cl.
*B32B 5/20*    (2006.01)
*B32B 5/24*    (2006.01)
(Continued)

(52) U.S. Cl.
CPC ............... *B32B 5/20* (2013.01); *B32B 5/245* (2013.01); *B32B 29/007* (2013.01); *C08J 9/14* (2013.01);
(Continued)

(58) Field of Classification Search
None
See application file for complete search history.

(56) References Cited

U.S. PATENT DOCUMENTS 4,576,972 A * 3/1986 Lunt et al. .................... 521/136
4,764,420 A * 8/1988 Gluck et al. ............... 428/317.7
(Continued)

FOREIGN PATENT DOCUMENTS

CN    101258191 A    9/2008
CN    101475728 A    7/2009
(Continued)

OTHER PUBLICATIONS

Sugano et al., Phenolic Resin Roam, Jul. 3, 2003, machine translation of JP2003-183439.*
(Continued)

*Primary Examiner* — Chinessa T Golden
(74) *Attorney, Agent, or Firm* — Birch, Stewart, Kolasch & Birch, LLP (57) ABSTRACT

A phenolic resin foam laminated sheet comprising a phenolic resin foam; and a face material for covering a surface of the phenolic resin foam, wherein the phenolic resin foam contains a hydrocarbon, a chlorinated aliphatic hydrocarbon or a combination thereof, a density of the phenolic resin foam is 10 kg/m$^3$ or higher and 100 kg/m$^3$ or lower, an average cell diameter of the phenolic resin foam is 5 μm or larger and 200 μm or smaller, a closed cell content of the phenolic resin foam is 85% or higher and 99% or lower, and an absolute value of a dimensional charge rate of the phenolic resin foam after 70° C. for 48 hours is 0.49% or lower.

6 Claims, 1 Drawing Sheet (51) Int. Cl.
*B32B 29/00* (2006.01)
*C08J 9/14* (2006.01)

(52) U.S. Cl.
CPC ............ *C08J 9/145* (2013.01); *B32B 2250/40* (2013.01); *B32B 2262/0276* (2013.01); *B32B 2262/101* (2013.01); *B32B 2266/0285* (2013.01); *B32B 2266/08* (2013.01); *B32B 2307/306* (2013.01); *B32B 2307/3065* (2013.01); *B32B 2307/72* (2013.01); *B32B 2307/734* (2013.01); *B32B 2419/00* (2013.01); *C08J 2203/14* (2013.01); *C08J 2203/142* (2013.01); *C08J 2361/06* (2013.01); *Y10T 428/249953* (2015.04)

(56) References Cited

U.S. PATENT DOCUMENTS

| | | | |
|---|---|---|---|
| 4,883,824 A | | 11/1989 | Meunier et al. |
| 4,900,759 A | * | 2/1990 | Clark ................. C08J 9/144 521/131 |
| 4,945,077 A | | 7/1990 | Meunier et al. |
| 5,234,969 A | | 8/1993 | Clark et al. |
| 6,013,689 A | * | 1/2000 | Rader ................. C08G 8/10 521/107 |
| 2009/0270005 A1 | | 10/2009 | Takahashi et al. |

FOREIGN PATENT DOCUMENTS

| | | | |
|---|---|---|---|
| EP | 66967 A | * | 12/1982 |
| EP | 0066967 A1 | | 12/1982 |
| JP | 58-1730 A | | 1/1983 |
| JP | 63-10642 A | | 1/1988 |
| JP | 2-180939 A | | 7/1990 |
| JP | 10-225993 A | | 8/1998 |
| JP | 11-343358 A | | 12/1999 |
| JP | 2003183439 A | * | 7/2003 |
| JP | 2006-28288 A | | 2/2006 |
| JP | 2007-70506 A | | 3/2007 |
| JP | 2007-70507 A | | 3/2007 |
| JP | 2007-331177 A | | 12/2007 |
| JP | 2008-24868 A | | 2/2008 |
| JP | 2008-239728 A | | 10/2008 |
| JP | 2009-90553 A | | 4/2009 |
| JP | 2009-262475 A | | 11/2009 |
| JP | 2009-263468 A | | 11/2009 |
| WO | WO 2007029221 A1 | * | 3/2007 |

OTHER PUBLICATIONS

International Preliminary Report on Patentability and English translation of Written Opinion of the International Searching Authority (Forms PCT/IB/338, PCT/IB373 and PCT/ISA/237), dated Nov. 1, 2012, for counterpart International Application No. PCT/JP2011/057409.

International Search Report issued in PCT/JP2011/057409, dated Jun. 28, 2011.

European Search Report dated Apr. 4, 2013 in counterpart European patent application No. 11759597.5.

Asahi Kasei Construction Materials Corporation, "Neoma Foam, High-performance phenolic-foam insulation panels", JIS A 9511 Class A 1-2 F****S, Sep. 2007, pp. 1-16.

Ito, "Phenolic foam", Plastics, vol. 32, No. 10, Oct. 1, 1981, pp. 1-3 and pp. 1-8 (Total pp. 11), along with a Parital English translation.

Japanese Notification of Information Provision, dated Mar. 29, 2016, for Japanese Application No. 2012-507103, along with an English translation.

Japanese Office Action dated Oct. 18, 2016, for Japanese Application No. 2012-507103, with an English translation.

* cited by examiner

PHENOLIC RESIN FOAM LAMINATED SHEET AND METHOD FOR MANUFACTURING THE SAME

TECHNICAL FIELD

The present invention relates to a phenolic resin foam laminated sheet and a method for manufacturing the same.

BACKGROUND ART

Phenolic resin foam laminated sheets have high heat insulation performance, flame retardant property, and heat resistance among foamed plastic-based heat insulating materials, and thus widely used as construction materials and materials for general industrial applications. When airtightness of heat-insulating layers would be secured under high temperature environments which are particularly severe conditions to withstand for heat-insulating materials used for roof of buildings etc., there is a case where a sealant or the like is separately applied in between heat-insulating materials, or between a heat-insulating material and a member such as a frame, and therefore it takes a lot of labor during construction. Also, in a composite board obtained by joining a phenolic resin foam laminated sheet and other members and/or in a heat-insulating structure where a finishing material such as mortar and/or resin is laminated on a surface of a phenolic resin foam laminated sheet applied without any gaps on the same plane, there are problems that the phenolic resin foam laminated sheet causes a change in dimensions, and therefore warp occurs, and/or cracks occur in the finishing material.

In Patent Literature 1, a method of manufacturing a phenolic resin foam laminated sheet is proposed, in which a plurality of partially cured foams are overlaid via spacers in a hot-air curing furnace and postcure is conducted at a predetermined temperature and wind speed.

CITATION LIST

Patent Literature

[Patent Literature 1] Japanese Patent Application Laid-Open No. 2006-28288

SUMMARY OF INVENTION

Technical Problem

However, in Patent Literature 1, a phenolic resin foam laminated sheet having dimensional stability required after construction has not been obtained.

In light of the aforementioned circumstances, the present invention aims to provide a phenolic resin foam laminated sheet having more improved dimensional stability than in the prior art, and a method for manufacturing the same.

Solution to Problem

The present inventors have found that, when airtightness of a heat-insulating layer having a phenolic resin foam would be secured, it is possible to secure the airtightness after construction without separately applying a sealing material or the like by extremely reducing the dimensional change rate of a phenolic resin foam laminated sheet and tightly fitting a heat-insulating material while applying a slight amount of compressive force in the in-plane direction thereof. Further, the present inventors have found that the following effects can be obtained by extremely reducing the dimensional change rate of a phenolic resin foam laminated sheet. Namely, with respect to a composite board obtained by joining phenolic resin foam laminated sheet and other members, it was found that it is possible to prevent occurrence of warp caused by a change in dimensions of the members disposed in one side of the composite board. The inventors have also found that, in a heat-insulating structure provided with a base material disposed on a principal surface of one side of the phenolic resin foam laminated sheet, and with a finishing material disposed on a principal surface of the other side of the phenolic resin foam laminated sheet, it is possible to prevent fracture of the finishing material caused by a difference in dimensional change between the phenolic resin foam laminated sheets and/or between the phenolic resin foam laminated sheet and other members at joint portions.

Also, the present inventors carried out extensive examinations, as a result, have found that it is possible to obtain a phenolic resin foam laminated sheet having improved dimensional stability by adjusting the viscosity and the water content of a phenolic resin and the free phenol content of the phenolic resin to values within specific ranges to produce a phenolic resin foam, and have accomplished the present invention based on these findings.

The present invention provides the following [1] to [6]:

[1] A phenolic resin foam laminated sheet comprising a phenolic resin foam; and a face material for covering a surface of the phenolic resin foam, wherein the phenolic resin foam contains a hydrocarbon, a chlorinated aliphatic hydrocarbon or a combination thereof, a density of the phenolic resin foam is 10 kg/m$^3$ or higher and 100 kg/m$^3$ or lower, an average cell diameter of the phenolic resin foam is 5 μm or larger and 200 μm or smaller, a closed cell content of the phenolic resin foam is 85% or higher and 99% or lower, and an absolute value of a dimensional change rate of the phenolic resin foam after 70° C. for 48 hours is 0.49% or lower.

[2] The phenolic resin foam laminated sheet according to [1], wherein a volatile component content of the phenolic resin foam is 1.0 wt % or more and 7.0 wt % or less.

[3] The phenolic resin foam laminated sheet according to any [2], wherein the phenolic resin foam contains the hydrocarbon and the chlorinated aliphatic hydrocarbon.

[4] The phenolic resin foam laminated sheet according to any one of [1] to [3], wherein an oxygen transmission rate of the face material is 4.5 cm$^3$/24 h·m$^2$ or higher.

[5] The phenolic resin foam laminated sheet according to any one of [1] to [4], wherein a thermal conductivity of the phenolic resin foam is 0.0150 W/m·K to 0.0250 W/m·K.

[6] A method for manufacturing a phenolic resin foam laminated sheet, the method comprising foaming and curing a foamable phenolic resin composition on a face material, the foamable phenolic resin composition comprising a phenolic resin; a curing catalyst; a foaming agent containing a hydrocarbon, a chlorinated aliphatic hydrocarbon or a combination thereof; and a surfactant, wherein a free phenol content of the phenolic resin is 1.0 wt % or more and 4.3 wt % or less, a water content of the phenolic resin is 1.0 wt % or higher and 10.0 wt % or lower, and a viscosity of the phenolic resin at 40° C. is 5000 mPa·s or higher and 100000 mPa·s or lower.

Advantageous Effects of Invention

According to the present invention, it is possible to provide a phenolic resin foam laminated sheet having improved dimensional stability, and a method for manufacturing the same. Particularly, according to the present invention, it is possible to provide a phenolic resin foam laminated sheet having improved dimensional stability under high temperature environments, and a method for manufacturing the same.

DESCRIPTION OF EMBODIMENTS

Hereinafter, preferred embodiments of the present invention will be described in detail with reference to the drawings. Note that the dimensional rate of the drawing is not limited to the rate illustrated in the drawing.

Figure 1:
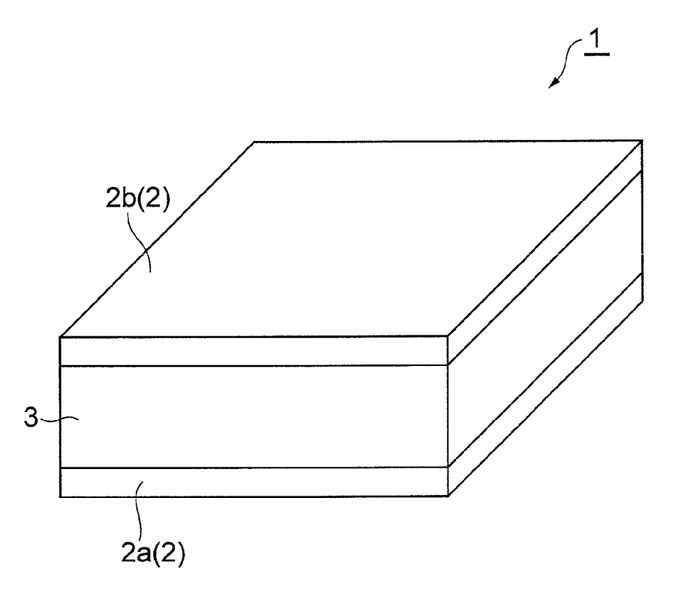
FIG. 1 is a schematic view showing a phenolic resin foam laminated sheet according to the present embodiment.

As shown in FIG. 1, a phenolic resin foam laminated sheet 1 according to the present embodiment comprises a face material 2 and a phenolic resin foam 3, and the face material 2 is composed of a first face material 2a and a second face material 2b. The phenolic resin foam 3 is a plate-like member sandwiched between the face materials 2a, 2b. The face materials 2a, 2b cover mutually opposing principal surfaces (surfaces) of the phenolic resin foam 3, and the principal surface of the phenolic resin foam 3 is in contact with the principal surfaces of the face materials 2a, 2b.

(Phenolic Resin Foam)

First, the phenolic resin foam 3 will be described. The phenolic resin foam 3 can be obtained by foaming and curing a foamable phenolic resin composition comprising a phenolic resin, a curing catalyst for the phenolic resin, a foaming agent containing a hydrocarbon, a chlorinated aliphatic hydrocarbon or a combination thereof, and a surfactant.

The phenolic resin can be obtained, for example, by using phenols and aldehydes as starting materials, heating at a temperature range of 40° C. to 100° C. with an alkaline catalyst to polymerize the above starting materials. Also, during the polymerization of a resole resin, additives such as urea may be added as required. If urea is added, it is preferred that urea previously methylolated with an alkaline catalyst be mixed in the resole resin. Since a synthesized phenolic resin usually contains an excessive amount of water, it is preferred that the synthesized phenolic resin be dewatered to a water amount that the synthesized phenolic resin is foamable. The water content of the phenolic resin is 1.0 wt % or more and 10.0 wt % or less, preferably 1.0 wt % or more and 7.0 wt % or less, more preferably 2.0 wt % or more and 5.0 wt % or less, and particularly preferably 2.0 wt % or more and 4.5 wt % or less. To adjust the water content of the phenolic resin to less than 1.0 wt %, it takes huge energy and a lot of time in dewatering, thus the productivity significantly lowers, and it becomes difficult to sufficiently obtain a phenolic resin foam laminated sheet having improved dimensional stability. If the water content of the phenolic resin is more than 10.0 wt %, shrinkage caused by drying increases under high temperature environments due to the increase of water contained in the obtained phenolic resin, and thus it becomes difficult to sufficiently obtain a phenolic resin foam laminated sheet having improved dimensional stability.

The start molar ratio of phenols to aldehydes in the phenolic resin is preferably in the range of 1:1 to 1:4.5, and more preferably in the range of 1:1.5 to 1:2.5. Examples of the phenols preferably used in synthesis of the phenolic resin include phenol, or a compound having a phenol skeleton. Examples of the compound having a phenol skeleton include resorcinol, catechol, o-, m- and p-cresol, xylenols, ethylphenols, p-tert-butylphenol. Binuclear phenols can also be used.

Examples of the aldehydes used in production of the phenolic resin include formaldehyde (formalin), or aldehyde compounds other than formaldehyde. Examples of the aldehyde compounds other than formaldehyde include glyoxal, acetaldehyde, chloral, furfural, and benzaldehyde. To the aldehydes, urea, dicyandiamide or melamine, etc. may be added as additives. Note that when these additives are added, the "phenolic resin" means a phenolic resin into which the additives have been added.

The viscosity of the phenolic resin is 5000 mPa·s or higher and 100000 mPa·s or lower, at 40° C. The viscosity of the phenolic resin at 40° C. is preferably 7000 mPa·s or higher and 50000 mPa·s or lower, and more preferably 10000 mPa·s or higher and 40000 mPa·s or lower, from the viewpoint of securing closed cell content and production costs. If the viscosity of the phenolic resin is lower than 5000 mPa·s, cell walls rupture because the viscosity of the resin is excessively low relative to the foaming pressure generated by vaporization of the foaming agent, causing a decrease in closed cell content. Meanwhile, if the viscosity of the phenolic resin is higher than 100000 mPa·s, a predetermined expansion ratio cannot be obtained because the viscosity of the resin is excessively high relative to the foaming pressure, it is impossible to fill a predetermined space during formation of foams, and thus it becomes difficult to sufficiently obtain a phenolic resin foam laminated sheet having improved dimensional stability, as well as obtaining undesirable high density of phenolic resin foams and impairing surface smoothness.

The free phenol content of the phenolic resin is 1.0 wt % or more and 4.3 wt % or less, preferably 2.3 wt % or more and 4.25 wt % or less, and more preferably 2.7 wt % or more and 4.2 wt % or less, from the viewpoint of ease of formulation of the phenolic resin and securing foamability. If the free phenol content of the produced phenolic resin foam is more than 4.3 wt %, it is conceivable that the resin portion of the phenolic resin foam softens by the plasticizing effect, increasing a change in dimensions. If the free phenol content of the resin is less than 1.0 wt %, the reactivity of the phenolic resin degrades, and exertion of the strength of the phenolic resin during formation of foams becomes slow, causing a decrease in closed cell content.

The phenolic resin may contain additives, for example, phthalates; glycols such as ethylene glycol and diethylene glycol; and the like which are generally used as plasticizers, can be used. In addition, aliphatic hydrocarbons, alicyclic hydrocarbons which have high boiling points, or a mixture thereof may also be used. The amount of the additives is preferably 0.5 parts by weight or more and 20 parts by weight or less based on 100 parts by weight of the phenolic resin. If the amount of the additives is more than 20 parts by weight, there is a tendency that the viscosity of the phenolic resin conspicuously lowers and this triggers rupture in cell walls during the formation of foams, whereas if the amount of the additives is less than 0.5 parts by weight, there is a tendency that this weaken the reason of adding the additives in the phenolic resin. The amount of the additives is more preferably 1.0 part by weight or more and 10 parts by weight or less.

The foaming agent can contain, as essential constituents, a hydrocarbon, a chlorinated aliphatic hydrocarbon or a combination thereof, from the viewpoint of a global warming potential. The weight ratio of the hydrocarbon, chlorinated aliphatic hydrocarbon or a combination thereof in the foaming agent is preferably 50 wt % or more, more preferably 60 wt % or more, still more preferably 70 wt % or more, particularly preferably 80 wt % or more, and most preferably 90 wt % or more. Among the hydrocarbon, chlorinated aliphatic hydrocarbon or a combination thereof, it is preferred to use hydrocarbon and chlorinated aliphatic hydrocarbon in combination. If hydrocarbon and chlorinated aliphatic hydrocarbon are used in combination, there is a tendency that the thermal conductivity is lower than that in the case of using hydrocarbon alone.

As a hydrocarbon-based foaming agent, preferred are cyclic, linear or branched alkanes, alkenes and alkynes having 3 to 7 carbon atoms, specific examples thereof include normal butane, isobutane, cyclobutane, normal pentane, isopentane, cyclopentane, neopentane, normal hexane, isohexane, 2,2-dimethylbutane, 2,3-dimethylbutane, cyclohexane and the like. Among these, cyclic, linear or branched alkanes, alkenes and alkynes having 4 to 5 carbon atoms are more preferred, and cyclic, linear or branched alkanes having 4 to 5 carbon atoms are still more preferred, for example, pentanes such as normal pentane, isopentane, cyclopentane and neopentane, and butanes such as normal butane, isobutane and cyclobutane are preferably used. These hydrocarbons may be used alone or two or more types thereof may be used in combination.

As a chlorinated aliphatic hydrocarbon-based foaming agent preferred are linear or branched chlorinated aliphatic hydrocarbons having 2 to 5 carbon atoms. The number of chlorine atoms bonded is not limited; however, preferred is 1 to 4. Examples of the chlorinated aliphatic hydrocarbon include chloroethane, propylchloride, isopropylchloride, butylchloride, isobutylchloride, pentylchloride, isopentylchloride and the like. Among these, linear or branched chlorinated aliphatic hydrocarbon having 3 carbon atoms such as propylchloride and isopropylchloride are more preferably used. These chlorinated aliphatic hydrocarbons may be used alone or two or more types may be used in combination.

When a foaming agent containing hydrocarbon and chlorinated aliphatic hydrocarbon is used, for example, preferred is a combination of a cyclic, linear or branched alkane having 4 to 5 carbon atoms and a linear or branched chlorinated aliphatic hydrocarbon having 2 to 5 carbon atoms; more preferred is a combination of a cyclic, linear or branched alkane having 4 to 5 carbon atoms and a linear or branched chlorinated aliphatic hydrocarbon having 3 carbon atoms; and still more preferred is a combination of a cyclic, linear or branched alkane having 5 carbon atoms and a linear or branched chlorinated aliphatic hydrocarbon having 3 carbon atoms.

The amount of the foaming agent used is preferably in the range of 1 part by weight to 25 parts by weight based on 100 parts by weight of the phenolic resin, and more preferably 1 part by weight to 15 parts by weight based on 100 parts by weight of the phenolic resin.

As for the surfactant, those generally used in production of phenolic resin foams can be used, and among these, nonionic surfactants are effectively used. Preferred examples of the nonionic surfactants include alkylene oxides being copolymers of ethylene oxide with propylene oxide; condensates of alkylene oxide with castor oil; condensates of alkylene oxide with alkylphenol such as nonylphenol and dodecylphenol; polyoxyethylene alkyl ethers which contain an alkyl ether moiety having 14 to 22 carbon atoms; further, fatty acid esters such as polyoxyethylene fatty acid ester; silicone-based compounds such as polydimethyl siloxane; and polyalcohols. These surfactants may be used alone or two or more types thereof may be used in combination. The amount of the surfactant used is not particularly limited; however, it is preferably in the range of 0.3 parts by weight to 10 parts by weight based on 100 parts by weight of the phenolic resin.

The curing catalyst may be any curing catalyst that can cure the phenolic resin, preferred is an acidic curing catalyst, and more preferred is an anhydrous acid curing catalyst. As the anhydrous acid curing catalyst, anhydrous phosphoric acid and anhydrous aryl sulfonic acid are preferred. Examples of the anhydrous aryl sulfonic acid include toluene sulfonic acid, xylene sulfonic acid, phenol sulfonic acid, substituted phenol sulfonic acid, xylenol sulfonic acid, substituted xylenol sulfonic acid, dodecylbenzene sulfonic acid, benzene sulfonic acid, and naphthalene sulfonic acid. These curing catalysts may be used alone or two or more types thereof may be used in combination. Further, as curing auxiliaries, resorcinol, cresol, saligenin (o-methylolphenol), p-methylolphenol and the like may be added. Further, these curing catalysts may be diluted with a solvent such as ethylene glycol, and diethylene glycol. The amount of the curing agent is not particularly limited; however, it is preferably in the range of 3 parts by weight to 30 parts by weight based on 100 parts by weight of the phenolic resin.

By mixing the phenolic resin, the curing catalyst, the foaming agent, and the surfactant, the foamable phenolic resin composition can be obtained. It is preferred that the phenolic resin, the curing catalyst, the foaming agent, and the surfactant be mixed at the percentages described above. By foaming and curing the obtained foamable phenolic resin composition as described below, it is possible to obtain the phenolic resin foam.

The volatile component content of this phenolic resin foam is preferably 1.0 wt % or more and 7.0 wt % or less, more preferably 1.1 wt % or more and 7.0 wt % or less, still more preferably 1.2 wt % or more and 6.8 wt % or less, and most preferably 1.3 wt % or more and 6.8 wt % or less. When the volatile component content is more than 7.0 wt %, a large amount of volatile components diffuses from the phenolic resin foam into the air after construction and/or under high temperature environments, and in the case of a phenolic resin foam having a high closed cell content, the pressure inside of cells decreases, therefore, there is a tendency to cause a large change in dimensions. Meanwhile, there is a tendency that huge energy and a lot of time are required to produce a phenolic resin form having a volatile component content of less than 1.0 wt %.

The density of the obtained phenolic resin foam is 10 kg/m$^3$ or more and 100 kg/m$^3$ or less, preferably 15 kg/m$^3$ or more and 80 kg/m$^3$ or less, more preferably 15 kg/m$^3$ or more and 40 kg/m$^3$ or less, still more preferably 15 kg/m$^3$ or more and 30 kg/m$^3$ or less, and most preferably 15 kg/m$^3$ or more and 28 kg/m$^3$ or less. If the density of the phenolic resin foam is less than 10 kg/m$^3$, the mechanical strength such as compressive strength lowers, it becomes difficult to sufficiently obtain a phenolic resin foam laminated sheet having improved dimensional stability, and it easily fractures during handling, thus is likely to cause problems in practical use. Meanwhile, if the density of the phenolic resin foam is more than 100 kg/m$^3$, the thermal conductivity degrades because of increased heat transmission in resin portions, and it becomes difficult to sufficiently obtain a phenolic resin foam laminated sheet having improved dimensional stability. The density of phenolic resin foams can be measured in accordance with JIS-K-7222.

The average cell diameter of the phenolic resin foam is preferably 5 μm or larger. Also, the average cell diameter of the phenolic resin foam is preferably 200 μm or smaller, more preferably 190 μm or smaller, and still more preferably 185 μm or smaller. If the average cell diameter of the phenolic resin is smaller than 5 μm, the thickness of cell walls becomes thinner, the mechanical strength lowers, and thus it becomes difficult to sufficiently obtain a phenolic resin foam laminated sheet having improved dimensional stability. If the average cell diameter of the phenolic resin foam is larger than 200 μm, the thermal conductivity degrades because of increased heat transmission caused by radiation, and it becomes difficult to sufficiently obtain a phenolic resin foam laminated sheet having improved dimensional stability.

The closed cell content of the phenolic resin foam is preferably 85% or higher, more preferably 88% or higher, and still more preferably 90% or higher. If the closed cell content of the phenolic resin foam is lower than 85%, not only the displacement rate of the foaming agent with air in cells becomes faster to increase the amount of change in heat insulation performance with time, but also it impairs the mechanical strength resistant to a shrinking stress under high temperature environments, and therefore, the dimensional change rate of the phenolic resin foam conspicuously degrades. The closed cell content of the phenolic resin foam can be measured in accordance with ASTM-D-2856.

An absolute value of the dimensional change rate of the phenolic resin foam after leaving the phenolic resin foam standing at a temperature of 70° C. for 48 hours is 0.49% or lower. If the dimensional change rate of the phenolic resin foam is higher than 0.49%, a gap is produced between the phenolic resin foam laminated sheets and/or between the phenolic resin foam and other members after a heat-insulating material is tightly fitted while applying an amount of compressive force in the in-plane direction thereof, and thus there is a need to separately perform an airtight sealing treatment such as sealing. In addition, in order to prevent displacement of the heat-insulating material caused by vibration or the like after the phenolic resin foam laminated sheet is tightly fitted, the dimensional change rate is desired to be small, and from such a viewpoint, the dimensional change rate is preferably 0.45% or lower, and more preferably 0.39% or lower. The dimensional change rate of the phenolic resin foam can be measured in accordance with EN1604.

The thermal conductivity of the phenolic resin foam is preferably 0.0150 W/m·K or higher, more preferably 0.0170 W/m·K or higher, and still more preferably 0.0190 W/m·K or higher. The thermal conductivity of the phenolic resin foam is preferably 0.0250 W/m·K or lower, more preferably 0.0230 W/m·K or lower, and still more preferably 0.0210 W/m·K or lower. The thermal conductivity of the phenolic resin foam can be measured in accordance with the plate heat flow measurement method in JIS-A-1412.

(Method for Manufacturing Phenolic Resin Foam Laminated Sheet)

Next, the method for manufacturing a phenolic resin foam laminated sheet 1 will be described. The phenolic resin foam laminated sheet 1 can be obtained by continuously discharging the above-mentioned foamable phenolic resin composition onto a first face material 2a which is running, and covering a surface of the foamable phenolic resin composition opposite to the surface thereof being in contact with the first face material 2a, with a second face material 2b, and foaming and curing the foamable phenolic resin composition.

From the viewpoint of production efficiency, it is preferred that the face material 2 sandwiching the phenolic resin foam 3 have flexibility. Examples of the face material having flexibility include synthetic fiber nonwoven fabric, synthetic fiber woven fabric, glass fiber paper, glass fiber woven fabric, glass fiber nonwoven fabric, glass fiber-mixed paper, papers, metal film or a combination thereof. These face materials may contain flame retardants to impart flame retardant property, for example, it is possible to use bromine compounds such as tetrabromo bis-phenol A and decabromo diphenylether; phosphorus or phosphorus compounds such as aromatic phosphate esters, aromatic condensed phosphate esters, halogenated phosphate esters and red phosphorus; antimony compounds such as antimony trioxide and antimony pentoxide; metal hydroxides such as aluminum hydroxide and magnesium hydroxide. These flame retardants may be mixed and kneaded in fibers of the face material, or may be added to binders such as acryl, polyvinyl alcohol, vinyl acetate, epoxy and unsaturated polyester. Also, the face materials may be surface-treated with water repellants such as fluororesin-based, silicone resin-based, wax emulsion-based, paraffin-based and acrylic resin-paraffin wax combined water repellants, or asphalt-based waterproofing agents. These water repellants and waterproofing agents may be used alone or may be applied to the face materials to which the flame retardants have been added.

It is preferred that the face material have high gas transmissivity. As such face materials, synthetic fiber nonwoven fabric, glass fiber paper, glass fiber nonwoven fabric and papers are preferably used. Among these face materials, face materials having oxygen transmission rates of 4.5 $cm^3/24$ $h·m^2$ or higher as gas transmissivity, measured in accordance with ASTM D3985-95, are particularly preferable. From the viewpoint of exudation of thermosetting resins to face materials during foaming and adhesion between thermosetting resins and face materials, when a synthetic fiber nonwoven fabric is used as a face material, the basis weight (weight per unit area) is preferably 15 $g/m^2$ to 80 $g/m^2$, when a glass fiber nonwoven fabric is used as a face material, the basis weight is preferably 30 $g/m^2$ to 200 $g/m^2$.

The foamable phenolic resin composition sandwiched by two face materials foams on the face material. In order to cure this foamed phenolic resin composition (foam), for example, the following first oven and second oven can be used.

The first oven generates 60° C. to 110° C. hot air, and includes an endless steel belt type double conveyer or a slat type double conveyer. In this oven, uncured foam is cured while being molded into the shape of a board, and thereby partially cured foam can be obtained. The first oven may be controlled to have a homogenous temperature throughout the inside area, or may have a plurality of temperature zones.

The second oven generates 40° C. to 120° C. hot air, and post-cures the foam that has been cured in the first oven. The partially cured boards may be overlaid at fixed intervals using a spacer and/or a tray. If the temperature inside of the second oven is higher than 120° C., there is a tendency that the pressure of the foaming agent inside cells of the foam excessively increases and this triggers breakage of foams, whereas the temperature of the inside of the second oven is lower than 40° C., there is a tendency that it takes too much time to proceed a reaction of the phenolic resin. From the same viewpoint, the temperature of the inside of the second oven is more preferably 80° C. to 110° C.

The foaming and curing method is not limited to the method described above.

According to the method for manufacturing a phenolic resin foam laminated sheet as described in the present embodiment, it is possible to provide a phenolic resin foam laminated sheet having high dimensional stability after construction under high temperature environments which are particularly severe conditions for heat-insulating materials to withstand, by using a foaming agent having a low global warming potential. The phenolic resin foam laminated sheet can be used alone, and may also be used as a heat-insulating structure having a base material disposed on a principal surface of one side of the phenolic resin foam laminated sheet and a finishing material disposed on a principal surface of the other side of the phenolic resin foam laminated sheet. In addition, in the case where a phenolic resin foam laminated sheet and a base material are laminated to form a heat-insulating structure, usually, there is unevenness in the base material, and thus unevenness also occur in the surface of the phenolic resin foam laminated sheet. For this reason, unevenness can be adjusted by removing a face material which is bonded to at least one side of the phenolic resin foam laminated sheet, or removing the foaming layer in an amount of about 10 mm at the maximum from the principal surface.

EXAMPLES

Hereinafter, the present invention will be further specifically described based on Examples and Comparative Examples, however, the present invention is not limited to the following Examples.

<Synthesis of Phenolic Resin>

Into a reaction vessel, 3500 kg of 52 wt % formaldehyde and 2510 kg of 99 wt % phenol were charged, stirred with a propeller type stirrer, and the liquid temperature inside reaction vessel was controlled to 40° C. by a temperature controller. Next, the temperature of the mixture was increased while adding a 50 wt % sodium hydroxide aqueous solution to proceed the reaction. At a stage where the Ostwald viscosity of the reaction liquid reached 60 centistokes (=60×10$^{-6}$ m$^2$/s, measured value at 25° C.), the reaction liquid was cooled, and 570 kg (corresponding to 15 mol % of the charged amount of formaldehyde) of urea was added thereto. Thereafter, the reaction liquid was cooled to 30° C., and a 50 wt % aqueous solution of para-toluene sulfonate monohydrate was added until the pH of the reaction liquid reached 6.4 to neutralize the reaction liquid.

After this reaction liquid was concentrated at 60° C., the free phenol content of the resin was measured and found to be 3.1 wt %. This is referred to as Phenolic resin A. Phenolic resins B to G shown in Table 2 were obtained by changing the concentration time and by adding water after concentration. The reaction time in the synthesis of the phenolic resin was adjusted, and the obtained reaction liquids were similarly concentrated at 60° C., thereby obtaining Phenolic resins H to J. Resin properties of the obtained Phenolic resins A to J were determined according to the following methods. Physical properties of the obtained Phenolic resins A to J are shown in Table 2.

<Free Phenol Content>

The free phenol content of the phenolic resin was determined by the following method.

1 mg of the phenolic resin was dissolved in 1 ml of methanol, and measurement was performed under the following conditions.
Apparatus: LC-VP type high performance liquid chromatography, manufactured by Shimadzu Corporation
Column: Xbridge C18 3.5 μm (inner diameter 3 mm×100 mm) manufactured by Waters, Temperature of Column: 40° C.
Eluent: water/acetonitrile
Gradient conditions: water/acetonitrile=90/10 (0 min)
water/acetonitrile=0/100 (20 min)
water/acetonitrile=90/10 (20.1 min)
water/acetonitrile=90/10 (35 min)
Flow rate: 0.47 ml/min
Detection: 270 nm
Injection volume: 5 μL The free phenol content of the resin was calculated from a calibration curve created using 10 μg/ml and 100 μg/ml solutions of phenol samples (Special grade reagent produced by Wako Junyaku Co., Ltd.).

<Water Content>

The water content of the phenolic resin was measured using a Karl-Fisher moisture meter MKA-510 (manufactured by Kyoto Electronics Manufacturing Co., Ltd.).

<Viscosity of Phenolic Resin>

After the phenolic resin was stabilized at 40° C. for 3 minutes, a viscosity of the phenolic resin was measured using a rotational viscometer (R-100 model, rotor portion: 3°×R-14, manufactured by Told Sangyo Co., Ltd.), and the measured value was regarded as the viscosity.

Example 1

To 100 parts by weight of Phenolic resin A, an ethylene oxide-propylene oxide block copolymer (PLURONIC F-127 produced by BASF Corporation) was mixed as a surfactant at a proportion of 2.0 parts by weight. A composition composed of 100 parts by weight of the mixed phenolic resin, 7 parts by weight of Foaming agent A as a foaming agent shown in Table 1, and 14 parts by weight of a mixture as an acid curing catalyst composed of 80 wt % of xylene sulfonic acid and 20 wt % of diethylene glycol was supplied to a mixing head, in which the temperature was controlled to 25° C., mixed, and the mixture was supplied onto a moving face material via a multi-port distributing tube. As a mixer, a mixer disclosed in Japanese Patent Application Laid-Open No. 10-225993 was used. Namely, the mixer is equipped with an introducing opening for a resin composition obtained by adding surfactant to the phenolic resin, and foaming agent, at a side surface of an upper part of the mixer, and the mixer is equipped with an introducing opening for a curing catalyst, at a side surface near the center of a stirring unit where a rotor stirs. The portion located downstream of the stirring unit communicates with nozzles for discharging foams. That is, the mixer is composed of a mixing unit (pre-step) up to the catalyst introducing opening, a mixing unit (post-step) from the catalyst introducing opening to a stirring finish unit, and a distributing unit from the stirring finish unit to the nozzles. The distributing unit includes a plurality of nozzles on the tip, and is designed so that the mixed foamable phenolic resin composition is uniformly distributed.

The foamable phenolic resin composition supplied onto the face material was conveyed to a slat type double conveyer with the temperature of 85° C., in a state where a surface of the foamable phenolic resin composition opposite to the surface being in contact with the face material was covered with another face material, and simultaneously, the foamable phenolic resin composition was sandwiched by two face materials. It was cured during a residence time of 15 minutes, and then cured for 2 hours by an oven with the temperature of 110° C. to obtain phenolic resin foam. A pressure was appropriately applied, via the face materials, to the foamable phenolic resin foam from the vertical direction by the use of the slat type double conveyer, thereby obtaining a board-shaped phenolic resin foam laminated sheet.

As for the face material, a nonwoven fabric made of polyester ("SPANBOND E05030, produced by Asahi Kasei Fibers Corporation, basis weight: 30 g/m², thickness: 0.15 mm) was used. The oxygen transmission rate of the face material was $3.7 \times 10^{10}$ cm³/24 h·m².

Example 2

A phenolic resin foam laminated sheet was obtained in the same manner as in Example 1 except that the phenolic resin was replaced by Phenolic resin B.

Example 3

A phenolic resin foam laminated sheet was obtained in the same manner as in Example 1 except that the phenolic resin was replaced by Phenolic resin C.

Example 4

A phenolic resin foam laminated sheet was obtained in the same manner as in Example 1, except that the phenolic resin was replaced by Phenolic resin D, and a mixture of 50 wt % of isopentane and 50 wt % of isobutane was used in an amount of 8.0 wt % based on the amount of the phenolic resin.

Example 5

A phenolic resin foam laminated sheet was obtained in the same manner as in Example 1 except that the phenolic resin was replaced by Phenolic resin E.

Example 6

A phenolic resin foam laminated sheet was obtained in the same manner as in Example 1 except that the phenolic resin was replaced by Phenolic resin H.

Example 7

A phenolic resin foam laminated sheet was obtained in the same manner as in Example 1 except that the phenolic resin was replaced by Phenolic resin I.

Example 8

A phenolic resin foam laminated sheet was obtained in the same manner as in Example 1, except that the phenolic resin was replaced by Phenolic resin B, the foaming agent was changed to Foaming Agent B shown in Table 1, the temperature of the slat type double conveyer oven was changed to 80° C. and the residence time was changed to 20 minutes.

Example 9

A phenolic resin foam laminated sheet was obtained in the same manner as in Example 1, except that the phenolic resin was replaced by Phenolic resin B, the foaming agent was changed to Foaming Agent C shown in Table 1, the temperature of the slat type double conveyer even was changed to 80° C. and the residence time was changed to 20 minutes.

Example 10

A phenolic resin foam laminated sheet was obtained in the same manner as in Example 1, except that the phenolic resin was replaced by Phenolic resin B, the foaming agent was changed to Foaming Agent D shown in Table 1, the temperature of the slat type double conveyer oven was changed to 80° C. and the residence time was changed to 20 minutes.

Example 11

A phenolic resin foam laminated sheet was obtained in the same manner as in Example 1, except that the phenolic resin was replaced by Phenolic resin B, and the foaming agent was changed to Foaming Agent E shown in Table 1.

TABLE 1

| Type of Foaming Agent | Foaming Agent 1/ Compositional Ratio (part by weight) | Foaming Agent 2/ Compositional Ratio (part by weight) |
| --- | --- | --- |
| Foaming Agent A | isopentane/50 | isobutane/50 |
| Foaming Agent B | isopentane/50 | isopropyl chloride/50 |
| Foaming Agent C | isopentane/0 | isopropyl chloride/100 |
| Foaming Agent D | isopentane/20 | isopropyl chloride/80 |
| Foaming Agent E | isopentane/90 | 1,1,1,2-tetrafluoroethane (F-134a)/10 |

Comparative Example 1

A phenolic resin foam laminated sheet was obtained in the same manner as in Example 1 except that the phenolic resin was replaced by Phenolic resin F.

Comparative Example 2

A phenolic resin foam laminated sheet was obtained in the same manner as in Example 1 except that the phenolic resin was replaced by Phenolic resin J.

Comparative Example 3

A phenolic resin foam laminated sheet was obtained in the same manner as in Example 1 except that the phenolic resin was replaced by Phenolic resin G.

The properties of the phenolic resin foams and phenolic resin foam laminated sheets obtained in Examples and Comparative Examples can be determined by the following methods.

<Volatile Component Content>

The volatile component content was calculated by the following equation, based on the assumption that the weight of the phenolic resin foam after being dried at 105° C. for 48 hours is represented by $W_D$, and the weight of the phenolic resin foam before being dried is represented by $W_O$. Note that pre-curing before the drying treatment was performed in accordance with 6.4 of EN1604.

Volatile component content [wt %]=$100 \times (W_O - W_D)/W_D$

<Dimensional Change Rate at 70° C.>

The dimensional change rate at 70° C. means a dimensional change rate $\Delta \varepsilon_b$ in either the lengthwise direction or the traverse direction of phenolic resin foam being cut out into 200 mm-square, determined by the testing method prescribed in EN1604. Note that the lengthwise direction and the traverse direction are respectively directions perpendicular to the thickness direction of the phenolic resin foam. Specifically, the dimensional change rate is a value obtained after a phenolic resin foam with 200-mm square in lengthwise and traverse directions is left standing at a temperature of 70° C. for 48 hours. $\Delta\varepsilon_b$ was calculated based on the following equation.

$$\Delta\varepsilon_b = 100 \times (b_t - b_0)/b_0$$

In the equation, $b_0$ represents a size at the initial stage, and $b_t$ represents a size after being left standing for 48 hours.

<Closed Cell Content>

A cylindrical-shaped sample having a diameter of 35 mm to 36 mm was cut out with a cork borer from the phenolic resin foam, and trimmed in 30 mm to 40 mm height, and then the volume of the sample was measured according to the standard approach in the use of an air-comparison type specific gravitometer (Model 1000, manufactured by Tokyo Science K.K.). The closed cell content is a value derived by dividing a value that is obtained by subtracting, from the volume of the sample, the volume of a cell wall calculated from the weight of the sample and the density of the resin, by an apparent volume calculated from the external size of the sample. The measurement was performed in accordance with ASTM-D-2856. Note that the density of the phenolic resin was taken as 1.3 kg/L.

<Average Cell Diameter>

The average cell diameter is a value obtained by drawing 4 straight lines of 9 cm in length, while avoiding voids, on a 50-fold magnified photograph of a cross-section of a test specimen obtained by cutting nearly center portion in the thickness direction of the phenolic resin foam in parallel with both side surfaces thereof, and determining, with regard to each straight line, the number of cells (the number of cells measured in accordance with JIS K6402) that each straight line has traversed, and dividing 1800 μm by an average value thereof.

<Density of Phenolic Resin Foam>

The density of phenolic resin foam is a value determined by measuring the weight of a 20 cm-square phenolic resin foam laminated sheet used as a sample, which is measured after the face material having been removed therefrom, and measuring the apparent value. The measurement was performed in accordance with JIS-K-7222.

<Thermal Conductivity of Foamed Product>

The thermal conductivity of a foamed product was measured using a phenolic resin foam cut out into 200 mm-square in lengthwise and traverse directions, a low temperature plate being set at 5° C. and a high temperature plate being set at 35° C., in accordance with the plate heat flow measurement method in JIS-A-1412.

<Foamability>

The obtained phenolic resin foam laminated sheets were observed to evaluate foamability based on 3 grades of A, B and C. A difference between a distance between the upper side slat and the lower side slat of the slat type double conveyer, and the thickness of the foam laminated sheet was evaluated, and a case having the difference of 0 mm to 2 mm was graded as "A", a case having the difference of more than 2 mm and less than 5 mm was graded as "B", and a case having the difference of 5 mm or greater was graded as "C".

The results are shown in Table 2.

<Overall Evaluation>

(Criteria of Overall Evaluation: Dimensional Change Rate×Foamability×Closed Cell Content)

As shown in Table 2, the foam laminated sheets of Examples 1 to 11 have small rates of dimensional change, high closed cell contents and excellent foamability, and thus are excellent in dimensional stability, as compared to the foam laminated sheets of Comparative Examples 1 to 3, and therefore all of them were graded as "A" or "B" in the overall evaluation. Since Comparative Example 1 is poor in foamability, Comparative Example 2 has a high dimensional change rate, Comparative Example 3 has considerably low closed cell content, and thus are inferior in dimensional stability, and therefore all of them were graded as "C" in the overall evaluation.

TABLE 2

|  |  | Example 1 | Example 2 | Example 3 | Example 4 | Example 5 | Example 6 | Example 7 |
|---|---|---|---|---|---|---|---|---|
| Resin Property | Viscosity [mPa · s] | Phenolic Resin A | Phenolic Resin B | Phenolic Resin C | Phenolic Resin D | Phenolic Resin E | Phenolic Resin H | Phenolic Resin I |
|  |  | 30,000 | 10,000 | 20,000 | 80,000 | 6,000 | 7,000 | 5,500 |
|  | Water Content [wt %] | 2.0 | 4.0 | 2.8 | 1.1 | 4.4 | 8.1 | 9.2 |
|  | Free Phenol Content [wt %] | 3.1 | 4.2 | 3.5 | 1.5 | 4.3 | 4.2 | 3.0 |
| Property of Foam & Foamable Laminated Sheet | Type of Foaming Agent | Foaming Agent A | Foaming Agent A | Foaming Agent A | Foaming Agent A | Foaming Agent A | Foaming Agent A | Foaming Agent A |
|  | Type of Face Material | nonwoven fabric made of polyester | nonwoven fabric made of polyester | nonwoven fabric made of polyester | nonwoven fabric made of polyester | nonwoven fabric made of polyester | nonwoven fabric made of polyester | nonwoven fabric made of polyester |
|  | Dimensional Change Rate [%] | −0.1 | −0.35 | −0.16 | −0.15 | −0.46 | −0.48 | −0.39 |
|  | Volatile Component Content of Foam [wt %] | 1.7 | 2.5 | 2.0 | 1.5 | 3.1 | 5.8 | 6.6 |
|  | Closed-Cell Content [%] | 97 | 95 | 97 | 95 | 93 | 86 | 91 |
|  | Average Cell Diameter [μm] | 72 | 103 | 82 | 70 | 115 | 112 | 121 |
|  | Density of Foam [kg/m$^3$] | 27.4 | 27.1 | 27.3 | 35.3 | 27.4 | 27.3 | 50.4 |
|  | Thermal Conductivity [W/m K] | 0.0200 | 0.0204 | 0.0202 | 0.0200 | 0.0204 | 0.0207 | 0.0210 |

TABLE 2-continued

|  |  |  |  |  |  |  |  |  |
|---|---|---|---|---|---|---|---|---|
|  | Foamability | A | A | A | B | A | A | A |
|  | Overall Evaluation | A | A | A | A | A | B | B |

|  |  | Example 8 | Example 9 | Example 10 | Example 11 | Comparative Example 1 | Comparative Example 2 | Comparative Example 3 |
|---|---|---|---|---|---|---|---|---|
| Resin Property | | Phenolic Resin B | Phenolic Resin B | Phenolic Resin B | Phenolic Resin B | Phenolic Resin F | Phenolic Resin J | Phenolic Resin G |
| | Viscosity [mPa·s] | 10,000 | 10,000 | 10,000 | 10,000 | 120,000 | 5.700 | 1,000 |
| | Water Content [wt %] | 4.0 | 4.0 | 4.0 | 4.0 | 0.5 | 10.1 | 5.8 |
| | Free Phenol Content [wt %] | 4.2 | 4.2 | 4.2 | 4.2 | 0.8 | 4.1 | 4.5 |
| Property of Foam & Foamable Laminated Sheet | Type of Foaming Agent | Foaming Agent B | Foaming Agent C | Foaming Agent D | Foaming Agent E | Foaming Agent A | Foaming Agent A | Foaming Agent A |
| | Type of Face Material | nonwoven fabric made of polyester | nonwoven fabric made of polyester | nonwoven fabric made of polyester | nonwoven fabric made of polyester | nonwoven fabric made of polyester | nonwoven fabric made of polyester | nonwoven fabric made of polyester |
| | Dimensional Change Rate [%] | −0.37 | −0.41 | −0.35 | −0.37 | — | −0.63 | — |
| | Volatile Component Content of Foam [wt %] | 2.7 | 3.1 | 2.8 | 2.6 | 0.3 | 7.2 | — |
| | Closed-Cell Content [%] | 94 | 85 | 88 | 94 | — | 81 | 1.6 |
| | Average Cell Diameter [μm] | 138 | 183 | 162 | 98 | — | 120 | 280 |
| | Density of Foam [kg/m³] | 27.5 | 27.3 | 27.1 | 27.3 | 92.0 | 26.7 | 28.9 |
| | Thermal Conductivity [W/m K] | 0.0192 | 0.0190 | 0.0190 | 0.0191 | — | 0.0216 | — |
| | Foamability | A | A | A | A | C | A | A |
| | Overall Evaluation | A | A | A | A | C | C | C |

REFERENCE SIGNS LIST

1 . . . phenolic resin foam laminated sheet, 2 . . . face material, 3 . . . phenolic resin foam.

The invention claimed is:

1. A phenolic resin foam laminated sheet comprising:
a phenolic resin foam; and
a face material for covering a surface of the phenolic resin foam,
the phenolic resin foam containing a hydrocarbon, a chlorinated aliphatic hydrocarbon or a combination thereof,
a density of the phenolic resin foam being 10 kg/m³ or higher and 100 kg/m³ or lower,
an average cell diameter of the phenolic resin foam being 5 μm or larger and 200 μm or smaller,
a closed cell content of the phenolic resin foam being 85% or higher and 99% or lower,
an absolute value of a dimensional change rate of the phenolic resin foam after 70° C. for 48 hours being 0.49% or lower, and
a volatile component content of the phenolic resin foam being 1.0 wt % or more and 7.0 wt % or less, wherein
the phenolic resin foam laminated sheet is obtained by a method comprising:
foaming and curing a foamable phenolic resin composition on a face material,
the foamable phenolic resin composition comprising:
a phenolic resin;
a curing catalyst;
a foaming agent containing a hydrocarbon, a chlorinated aliphatic hydrocarbon or a combination thereof; and
a surfactant,
a free phenol content of the phenolic resin being 1.0 wt % or more and 4.3 wt % or less,
a water content of the phenolic resin being 1.0 wt % or higher and 9.2 wt % or lower, and
a viscosity of the phenolic resin at 40° C. being 5000 mPa·s or higher and 100000 mPa·s or lower, and wherein
the volatile component content is determined by the following equation:

Volatile component content (wt %)=100×($W_O$−$W_D$)/$W_D$, wherein $W_D$ represents a weight of the phenolic resin foam after being dried at 105° C. for 48 hours, and $W_O$ represents a weight of the phenolic resin foam before being dried, and
wherein the dimensional change rate is a value obtained based on the phenolic resin foam of 200-mm square left standing at a temperature of 70° C. for 48 hours and the dimensional change rate ($\Delta\varepsilon_b$) is calculated based on a following equation:

$\Delta\varepsilon_b$=100×($bt$−$b_0$)/$b_0$, where said $b_0$ represents a size at an initial stage, and said bt represents a size after being left standing for 48 hours.

2. The phenolic resin foam laminated sheet according to claim 1, wherein the phenolic resin foam contains the hydrocarbon and the chlorinated aliphatic hydrocarbon.

3. The phenolic resin foam laminated sheet according to claim 1, wherein an oxygen transmission rate of the face material is 4.5 cm$^3$/24 h·m$^2$ or higher.

4. The phenolic resin foam laminated sheet according to claim 1, wherein a thermal conductivity of the phenolic resin foam is 0.0150 W/m·K to 0.0250 W/m·K.

5. The phenolic resin foam laminated sheet according to claim 1, wherein the thermal conductivity of the phenolic resin foam is 0.0190 W/m·K to 0.0250 W/m·K.

6. A method for manufacturing a phenolic resin foam laminated sheet according to claim 1, the method comprising:
   foaming and curing a foamable phenolic resin composition on a face material,
   the foamable phenolic resin composition comprising:
   a phenolic resin;
   a curing catalyst;
   a foaming agent containing a hydrocarbon, a chlorinated aliphatic hydrocarbon or a combination thereof; and
   a surfactant,
   a free phenol content of the phenolic resin being 1.0 wt % or more and 4.3 wt % or less,
   a water content of the phenolic resin being 1.0 wt % or higher and 9.2 wt % or lower, and
   a viscosity of the phenolic resin at 40° C. being 5000 mPa·s or higher and 100000 mPa·s or lower.

* * * * *